United States Patent [19]

Jonner et al.

[11] Patent Number: 4,796,739

[45] Date of Patent: Jan. 10, 1989

[54] CLUTCH ACTUATION DEVICE

[75] Inventors: Wolf-Dieter Jonner, Beilstein; Jurgen Zechmann, Heilbronn, both of Fed. Rep. of Germany

[73] Assignee: Robert Bosch GmbH, Stuttgart, Fed. Rep. of Germany

[21] Appl. No.: 62,991

[22] Filed: Jun. 17, 1987

[30] Foreign Application Priority Data

Sep. 10, 1986 [DE] Fed. Rep. of Germany ....... 3630750

[51] Int. Cl.⁴ .............................................. F16D 67/04
[52] U.S. Cl. ................................ 192/13 R; 192/85 R; 192/85 C
[58] Field of Search ............... 192/0.055, 13 R, 0.094, 192/0.096, 85 C, 30 R, 82 R, 85 R, 84 R; 180/197

[56] References Cited

U.S. PATENT DOCUMENTS

| | | | |
|---|---|---|---|
| 3,863,730 | 2/1975 | Wakamatsu et al. | 180/197 |
| 4,438,664 | 3/1984 | Fiala | 192/0.096 X |
| 4,618,043 | 10/1986 | Hattori et al. | 192/0.096 X |
| 4,671,397 | 6/1987 | Asagi et al. | 192/0.096 X |
| 4,676,353 | 6/1987 | Matsuda | 192/3.31 X |

*Primary Examiner*—Rodney H. Bonck
*Attorney, Agent, or Firm*—Edwin E. Greigg

[57] ABSTRACT

The present invention relates to a clutch actuation device wherein the functional connection between actuation of the clutch and the excursion of the clutch pedal is made via an interposed electronic control unit. A first depression sensor is located on the clutch pedal for the purpose of determining the set value and a further sensor for determining the actual value is located on a lever of the clutch. The lever is connected to an actuation cylinder which is adjustable by means of a control valve in response to the output signals from the electronic control unit. In addition to the set value which is determined via the sensor, the electronic control unit is supplied with an additional signal from a regulating unit; the additional signal being dependent on the presence of a regulating function of a locking protection control system (LPCS). Accordingly, the above-described device is designed to allow automatic actuation of the clutch in an LP control system.

4 Claims, 1 Drawing Sheet

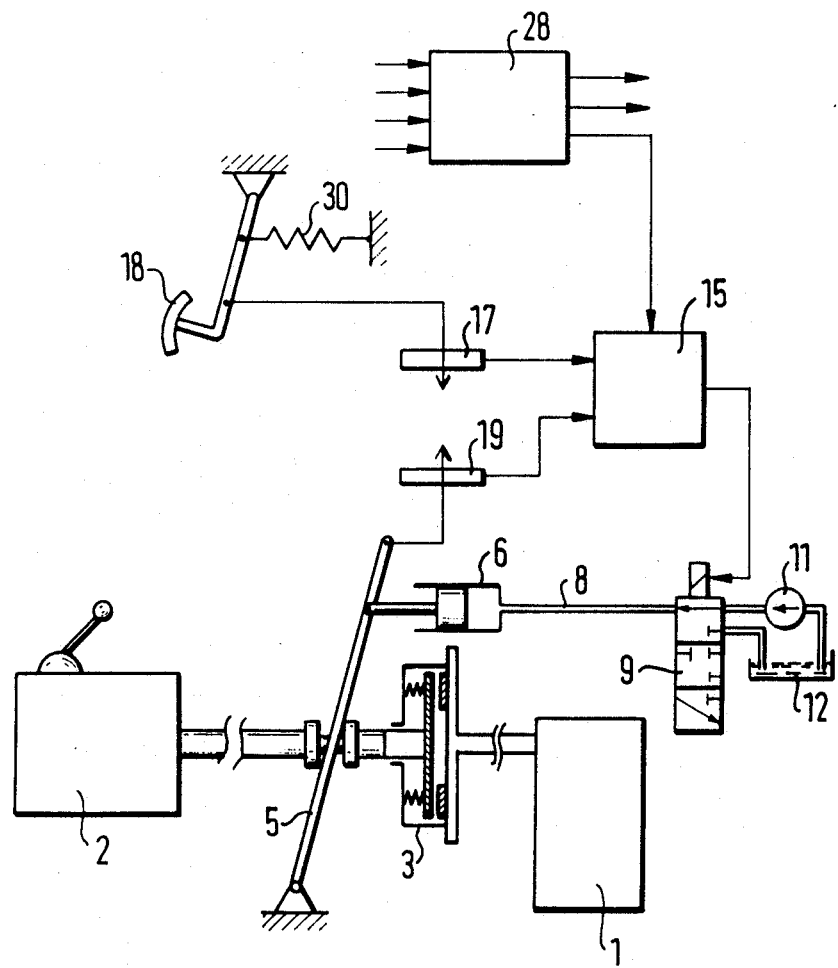

CLUTCH ACTUATION DEVICE

BACKGROUND OF THE INVENTION

The present invention relates to a clutch actuation device as described hereinafter.

Clutch actuation devices are already known wherein actuation of a shift mechanism is not directly effected by mechanical means by way of the clutch pedal but the shifting movement is performed by a pneumatic or hydraulic actuating device in response to electric control signals from a control unit. These control signals are, in turn, formed on the basis of the engine speed, load and the disengaging position at the clutch. Devices of this type are used primarily in vehicles with semi-automatic gear systems where the gears are still shifted in the normal manner by the driver but where the shifting process only requires the actuation of a switchcontact on the part of the driver. The actual "proportioning of power" to the clutch, which is particularly important during initial acceleration of the vehicle, is then performed exclusively by the control unit and can no longer be influenced by the driver.

The advantage of the above-described systems over the conventional systems operated exclusively by the driver is that they offer increased ease of use without the disadvantage of the high production costs of fully automatic gears.

However, the advantage of the ease of use of the above clutch actuation systems is somewhat outweighed by the disadvantage that the driver has no input in critical driving situations, particularly in the proportioning of power to the clutch.

It is also known (U.S. Pat. No. 4,491,919), in the case of a locking protection control system (LPCS) equipped vehicle with a service-brake configuration to break the drive connection to the drive wheels via a multi-way magnetic valve by an appropriate application of pressure on the coupling cylinder simultanously with the onset of the LPCS regulating action on the brake system, i.e., to disengage in order to interrupt, at least temporarily, any braking action by the i.c. engine on the wheels driven by the same. As a result, opposing influences can be reliably avoided. Re-engagement is not controlled by the driver but is preferably time-controlled to avoid a coupling jolt.

OBJECT AND SUMMARY OF THE INVENTION

The clutch actuation device according to the invention comprises a clutch pedal which is designed to be used in the normal way but which does not mechanically or hydraulically influence the coupling in the known manner but rather is connected to a position pick-up which, in turn, produces an analog signal corresponding to the pedal depression which is supplied to the control unit.

The advantage of interposing a control unit of the afore-mentioned type consists in the opportunity it provides to process other signals, which are necessary for actuation of the clutch, in addition to pedal depression. More specifically, it is possible to bring about engagement or disengagement in a locking protection control system (LPCS) or a slip control system (SCS).

It is especially advantageous to act on the clutch pedal by way of suitable measures with a force characteristic which is similar to that of mechanically actuated clutches. As a result, it is possible for the transmission fork to "work" in the usual way with the clutch, more specifically, to allow the clutch to slip in appropriate driving situations.

BRIEF DESCRIPTION OF THE DRAWINGS

The drawing is a diagram of a clutch actuation device according to the invention.

DESCRIPTION OF THE PREFERRED EMBODIMENT

In the drawing, 1 designates an engine, for example, an internal combustion engine, which is connected to a gear system 2 through the interpositioning of a clutch 3. The mechanical actuation of the clutch 3 is by way of a lever 5 which is acted on by the work piston of an actuation cylinder 6. The actuation cylinder 6 is is connected via a pressure line 8 and a control valve 9 with a pressure source consisting primarily of a pressure medium pump 11 and a storage container 12. The control valve 9 is electrically actuatable and can preferably be switched into three positions. In the first position a flow connection is produced between the pressure medium pump 11 and the actuation cylinder 6 and a connection to the storage container 12 is blocked. In the second position the pressure medium pump 11, the storage container 12 and the actuation cylinder 6 are cut off from one another and, in the third position, the flow connection from the pressure medium pump 11 to the actuation cylinder 6 is blocked and return of pressure medium from the actuation cylinder 6 to the storage container 12 is made possible.

The control valve 9 is controlled by means of electrical output signals from an electronic control unit 15.

A first input signal to the electronic control unit 15 comes from a first depression sensor 17. This first sensor 17 gauges the respective position of a clutch pedal 18, which is actuatable by the driver, for example, in the normal manner by the foot and produces an output signal which corresponds to the amount of pedal depression. The greater the pedal depression, the greater is the output signal of sensor 17.

A second input signal is produced by a second depression sensor 19. This signal indicates the respective position of the lever 5 and hence the position of the cooperating clutch plates with respect to one another.

A third input signal to the electronic control unit 15 is produced by a regulating unit 28 which, for example, is part of a locking protection control system (LPCS) or of a slip control system (SCS).

The clutch pedal 18 is acted on by the force of a resistance element 30, for example, a spring of any suitable type as a coil spring, and hence actuation of the clutch pedal 18 is only possible against the precisely definable force of this resistance element 30. Accordingly, a randomly selectable pedal characteristic can be obtained by means of the resistance element 30. In this way the force characteristic of the resistance element 30 can be expediently established by connecting different springs or spring systems in series or in parallel in an appropriate manner. Instead of the first depression sensor 17, the extent of actuation of the clutch pedal 18 can also be determined by means of a pressure sensor which determines the pedal pressure. The second depression sensor 19 can also be replaced by a pressure sensor.

The above-described device operates in the following manner: the first depression sensor 17 detects any position changes of the clutch pedal 18 when it is actuated by the driver. These position changes result in corresponding increasing or decreasing output signals which are supplied to the electronic control unit 15 as set values in which the output signals increase as the pedal is depressed. A comparison of the set value and the actual value is made in the electronic control unit 15; the actual value, through the disengagement position of the coupling 3, being opposite that which is detected by the second depression sensor 19. When a discrepancy is detected between the actual value and the set value a corresponding adjustment of the control valve 9 is made by the electronic control unit 15. When the actual value and the set value correspond to one another, the control valve 9 is switched by the control unit 15 into the second position in which the pressure medium pump 11, the storage container 12 and the actuation cylinder 6 are cut off from one another. The transfer characteristic between the extent of depression of the clutch pedal 18 and the extent of actuation of the lever 5 is established in the electronic control unit 15. The corresponding transfer function can be linear, degressive, progressive or otherwise.

During driving, especially when there is ice or snow, it may happen that the frictional contact between the vehicle wheel and the ground is broken simply because of switching into a lower gear and having a higher engine-braking moment. As a result, lateral wheel guidance is no longer ensured which is a state similar to the condition of locking wheels. A similar driving condition can also occur in the case of a vehicle equipped with an LPCS which influences the brake system. As a vehicle equipped with LPCS already has wheel speed sensors, the above-described clutch actuation device has increased significance.

When an LPCS sensor (not shown on the drawing) on a vehicle equipped with a clutch actuation device detects a slip between the wheel of the vehicle and the ground, the regulating unit 28 (which may be an LPCS control device) supplies a corresponding electrical signal to the electronic control unit 15. This electric signal is processed by the electronic control unit 15 as a second set value; said set value issued by the regulating unit 28 having preference over the set value supplied by the first depression sensor 17, resulting from a partial depression of the clutch pedal which results in a signal smaller than the output signal of the regulating unit i.e., when both signals are present, the electronic control unit 15 processes the signal from the regulating unit 28 as though it were the only signal present. In this case the clutch 3 is disengaged by the actuation cylinder 6. Thus, the engine 1 and the gear 2 are reliably separated. This disengaged position of the clutch 3 is maintained by the electronic control unit 15 as long as the corresponding LPCS signal is at the regulating unit 28.

If the driver depresses the clutch pedal to its maximum thereby causing a maximum output signal from the first depression sensor 17 while the signal from the regulating unit 28 indicating the LPCS situation is still at the electronic control unit 15 - a state which is terminated at the electronic control unit 15, for example, when the two set values are identical - the signal from the regulating unit 28 is ignored and the position of the clutch 3 is taken only from the set value produced by the first depression sensor 17. If the driver then returns the clutch pedal 18, the position of the clutch 3 is only set according to the set value produced by the first depression sensor 17 if the LPCS signal from the regulating unit 28 is no longer present. However, if the LPCS signal is still present or has returned when the driver returns the clutch pedal 18, the LPCS signal from the regulating unit 28 is processed as the dominant signal and the clutch 3 remains completely disengaged.

If, during such an LPCS situation, i.e., when automatically disengaged, the driver should, for some reason, want to accelerate the vehicle, for example, to pass someone, he can do this by depressing the accelerator. In this circumstance, a butterfly valve switch which is functionally connected to the accelerator sends another electrical signal to the electronic control unit 15. When the latter is received, the signal from the regulating unit 28 indicating the LPCS situation is ignored and the extent of actuation of the clutch 3 matches the extent of depression of the clutch pedal 18.

This possibility of being able to counteract the automatic disengagement of the clutch 3 resulting from the receipt of a signal from the regulating unit 28, simply by depressing the accelerator, can be extremely important, particularly when the driver must accelerate the vehicle during an LPCS state.

Another application of the device according to the invention consists in using it in conjunction with a slip control system (SCS). In this way, when slippage occurs between the vehicle wheel and the ground, the regulating unit 28 - which can also be an SCS control device - can supply an electrical signal to the electronic control unit 15, resulting in disengagement of the clutch 3.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A clutch actuation device for a vehicle comprising an actuating operative element to engage and disengage a clutch (3) in response to output signals from an electronic control unit (28), a clutch pedal (18), a first sensor (17) which determines an extent of depression of said clutch pedal (18) and sends a measurement signal whose magnitude depends on the position of said clutch pedal (18) to the electronic control unit (15), a further sensor (19), which sends another measurement signal to the electronic control unit (15) which depends on the position of a clutch actuation element (5) of said actuating operative element, said electronic control unit (15) produces an output signal depending upon a set value input associated with said first sensor (17) and by a second actual value input associated with said further sensor (19), which output signal is directed to a fluid pressure control valve (9), and said vehicle is equipped with a brake locking protection control system (LPCS) controllable via a regulating unit (28), which includes a signal transmission device which, when a brake locking protection function is present, supplies an additional signal produced in the regulating unit (28) to said electronic control unit (15) and in response thereto, said control valve 9 is switched to permit fluid flow to operate a piston of said clutch actuation element (5) which disengages said clutch (3) in which, upon simultaneous receipt of a measurement signal from said sensor (17) and an additional signal from said regulating unit (28), said electronic control unit (15) forms an output signal which is the same as it would form if only the additional signal from the regulating unit (28) were present.

2. A device as claimed in claim 1, in which said first sensor is a depression detector (17).

3. A device as claimed in claim 1, which includes a force resistance element (30) acting in opposition to a direction of depression of said clutch pedal (18).

4. A device as claimed in claim 1, in which said clutch pedal (18) is in a position of least engagement and said electronic control unit (15) supplies said same output signal as it would if only the measurement signal from said first sensor (17) were present.

* * * * *